United States Patent [19]

Yamahara et al.

[11] 3,929,773

[45] Dec. 30, 1975

[54] PROCESS FOR PREPARATION OF A PALLADIUM COMPLEX COMPOUND

[75] Inventors: Takeshi Yamahara, Itami; Takashi Deguchi, Ibaraki; Shinji Nakamura, Takatsuki, all of Japan

[73] Assignee: Sumitomo Chemical Company, Limited, Japan

[22] Filed: Apr. 5, 1974

[21] Appl. No.: 458,416

[30] Foreign Application Priority Data

Apr. 5, 1973 Japan.................................. 48-39357

[52] U.S. Cl............ 260/242; 260/270 R; 260/453 A
[51] Int. Cl.$^2$......................................... C07F 15/00
[58] Field of Search ............ 260/242, 270; 252/429, 252/431

[56] References Cited

UNITED STATES PATENTS 3,794,648   2/1974   Hammond et al. ................. 260/242

*Primary Examiner*—Harry I. Moatz
*Attorney, Agent, or Firm*—Stewart and Kolasch, Ltd.

[57] ABSTRACT

A process for preparation of a palladium complex compound, useful as a catalyst in the production of aromatic isocyanates from aromatic nitro compounds and carbon monoxide in a single step, which comprises reacting (A) metallic palladium, (B) a nitrogen-containing heteroaromatic compound, (C) a halogen compound selected from the group consisting of hydrogen halides and halides of the elements belonging to any of Groups III, IV, V and VI in the periodic table and (D) an oxygen-containing oxidizing agent.

6 Claims, No Drawings

PROCESS FOR PREPARATION OF A PALLADIUM COMPLEX COMPOUND

The present invention relates to a process for preparation of a palladium complex compound. More particularly, it relates to an improved process for preparation of a palladium complex compound useful as a catalyst in the production of various organic compounds.

The complex compound of a palladium halide with a nitrogen-containing heteroaromatic compound is representable by the formula: $PdL_2X_2$ wherein L represents a nitrogen-containing heteroaromatic compound and X is a halogen atom and is useful as a catalyst in the production of various organic compounds, for instance, in the production of aromatic isocyanates from aromatic nitro compounds and carbon monoxide in a single step (cf. German Pat. No. 1,815,517).

Such complex compound has heretofore been produced by the use of palladium halides, for instance, by reacting palladium chloride with a nitrogen-containing heteroaromatic compound (e.g. pyridine) while heating as shown in the following formulae:

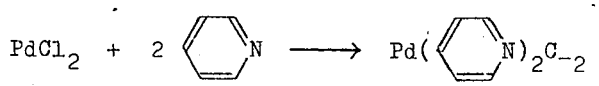

or by reacting a complex between a palladium halide and a benzonitrile (e.g. benzonitrile) with a nitrogen-containing heteroaromatic compound as shown in the following formulae:

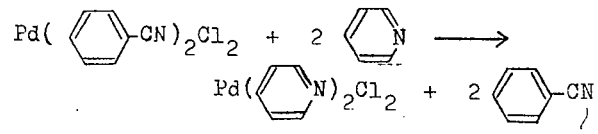

As understood from the above explanation, it is essential that metallic palladium is required to be first converted into a halide for use in a conventional process for preparation of the palladium complex compound.

An extensive study has been made for the preparation of a complex of a palladium halide with a nitrogen-containing heteroaromatic compound directly from metallic palladium by a simple operation. As the result, such purpose has now been accomplished by reacting (A) metallic palladium, (B) a nitrogen-containing heteroaromatic compound, (C) a halogen compound selected from the group consisting of hydrogen halides and halides of the elements belonging to any of Groups III, IV, V and VI in the periodic table and (D) an oxygen-containing oxidizing agent.

The metallic palladium may be palladium as a simple substance (e.g. palladium black, palladium sponge). It may be also used in the form of a mixture with any palladium compound such as palladium oxide or palladium halide or an inactivated palladium complex catalyst including decomposed and liberated metallic palladium, or a deposited material on a suitable carrier such as activated carbon or activated alumina.

The nitrogen-containing heteroaromatic compound is the one having a nitrogen-containing 6-membered heteroaromatic ring in its structure. Examples of such nitrogen-containing heteroaromatic compounds include pyridine, 2-chloropyridine, 2-bromopyridine, 2-fluoropyridine, 4-phenylpyridine, α-picoline, 5-ethyl-α-picoline, lutidine, 2-vinylpyridine, 2-styrylpyridine, 3-chloropyridine, 2,6-dichloropyridine, 2-chloro-4-methylpyridine, 4-phenylthiopyridine, 2-methoxypyridine, phenyl α-picolinate, methyl α-picolinate, 2,6-dicyanopyridine, α-picolylaldehyde, α-picolinamide, 5,6,7,8-tetrahydroquinoline, 2,2'-dipyridine, quinoline, isoquinoline, 2-chloroquinoline, acridine, phenanthridine, 1,5-naphthyridine, 1,6-naphthyridine, 1,7-naphthyridine, 1,8-naphthyridine, 2,6-naphthyridine, 2,7-naphthyridine, benzo[h]quinoline, benzo[f]quinoline, benzo[g]quinoline, benzo[h]isoquinoline, benzo[f]isoquinoline, benzo[g]isoquinoline, pyrazine, pyrimidine, pyridazine, quinazoline, phthalazine, quinoxaline, cinnoline, phenazine, polyvinylpyridine, styrene-vinylpyridine copolymer, etc.

Among the halogen compounds, the hydrogen halide may be hydrogen fluoride, hydrogen chloride, hydrogen bromide, hydrogen iodide, etc. The halogen compounds of an element belonging to any of Groups III, IV, V and VI in the periodic table may be those having at least one halogen atom directly bonded to the said element. Specific examples are aluminum chloride, aluminum bromide, boron chloride, carbon tetrachloride, chloroform, bromoform, phosgene, carbonyl bromide, benzyl chloride, benzyl bromide, benzotrichloride, acetyl chloride, benzoyl chloride, phthaloyl dichloride, silicon tetrachloride, trimethylsilyl chloride, dimethyldichlorosilane, tin tetrachloride, titanium tetrachloride, phosphorus trichloride, phosphorus pentachloride, phosphorus tribromide, phosphorus pentabromide, phosphorus oxychloride, thionyl chloride, thionyl bromide, sulfuryl chloride, tetramethylammonium chloride, tetramethylammonium bromide, etc. In the preparation of the palladium complex compound of the invention, these halogen compounds may be used as such or in any appropriate form such as aqueous solutions, salts with the said nitrogen-containing heteroaromatic compounds, adducts to suitable compounds from which the necessary components can be reversibly liberated and the like.

The oxygen-containing oxidizing agent may be an oxidizing agent, from which an oxygen atom is lost for performance of oxidation. Specific examples are air, oxygen, ozone, hydrogen peroxide, hydroxylamine, alkyl hydroperoxides (e.g. t-butyl hydroperoxide, cumene hydroperoxide), dialkyl peroxides (e.g. di-t-butyl peroxide, dicumyl peroxide), organic peracids (e.g. peracetic acid, perbenzoic acid), organic peracid anhydrides (e.g. benzoyl peroxide, lauroyl peroxide), organic peracid esters (e.g. t-butyl perbenzoate), nitric acid, nitrates, nitric acid esters, tertiary amine oxides (e.g. triethylamine oxide, pyridine oxide), nitrile oxides (e.g. benzonitrile oxide), organic nitro compounds (e.g. nitrobenzene, 4-nitrotoluene, 2,4-dinitrotoluene, 2,6-dinitrotoluene), permanganates, bichromates, hypochlorites, persulfates, etc.

The preparation of the palladium complex compound is usually carried out in an appropriate solvent such as an aromatic hydrocarbon (e.g. benzene, toluene, xylene), a halogenated hydrocarbon (e.g. chlorobenzene, dichlorobenzene), an alcohol (e.g. ethanol, phenol), an ether (e.g. diethyl ether, diphenyl ether), a carboxylic acid (e.g. acetic acid, propionic acid), an ester (e.g. methyl benzoate), a nitrile (e.g. acetonitrile, benzonitrile), an amide (e.g. dimethylformamide, dimethylacetamide), a sulfoxide (e.g. dimethylsulfoxide) or water. The nitrogen-containing heteroaromatic compound itself may be used as a reaction medium.

In the reaction according to the process of the invention, the amount of the nitrogen-containing heteroaromatic compound to be used may be from about 2 to 200 moles to 1 mole of the metallic palladium. Sometimes, the amount employed may be more.

The halogen compound may be employed in a stoichiometric amount with respect to the metallic palladium or in excess.

The oxygen-containing oxidizing agent (in terms of effective oxygen atom) is normally employed in an equimolar amount or more with respect to the metallic palladium.

The reaction is usually carried out at a temperature from about 0° to 250°C, preferably from about 50° to 200°C.

The palladium complex compound thus prepared is useful as a catalyst, for instance, in the production of aromatic isocyanates by the reaction of aromatic nitro compounds with carbon monoxide at elevated temperatures under elevated pressures. As the result of such use, the palladium complex compound is partly decomposed to liberate metallic palladium (e.g. palladium black) so that the catalytic activity is decreased.

The thus inactivated catalyst can be reactivated in substantially the same procedure as adopted in the preparation of the catalyst. In other words, the liberated metallic palladium may be converted into the catalytically active palladium complex compound in substantially the same manner as above.

The treatment for the reactivation may be applied to the reaction mixture containing the liberated metallic palladium itself or to the metallic palladium alone or in combination with any other solid component separated from the reaction mixture. In such treatment, the proportion of the materials (A), (B), (C) and (D) may be the same as stated above. As the material (B), i.e. the nitrogen-containing heteroaromatic compound, the one produced in the liberation of the metallic palladium and present in the reaction mixture may be utilized as such. Similarly, the material (C), i.e. the halogen compound, may be the one also produced in the liberation of the metallic palladium and present in the reaction mixture.

Practical and presently preferred embodiments of the invention are illustratively shown in the following Examples.

Example 1

In a 100 ml volume flask, palladium black (0.746 g), pyridine hydrochloride (2.0 g), t-butylhydroperoxide (5 ml) and o-dichlorobenzene (50 ml) were charged, and the resultant mixture was heated at 150°C for 2 hours while stirring. After cooling, the reaction mixture was filtered. The collected material was washed with chloroform, and the washing was combined with the filtrate and the combined mixture was poured into a large amount of petroleum ether. The precipitate was collected by filtration, washed with petroleum ether and dried under reduced pressure to give a pale yellowish powder (2.1 g). By the elementary analysis and the infrared absorption spectrum, the product was confirmed to be bispyridinepalladium chloride ($Pd(C_5H_5N)_2Cl_2$).

Example 2

In a 50 ml volume flask, palladium black (0.075 g), pyridine hydrochloride (0.16 g), t-butylhydroperoxide (0.3 ml) and o-dichlorobenzene (10 ml) were charged, and the resultant mixture was refluxed for 30 minutes. The reaction mixture was cooled and treated as in Example 1 to give bispyridinepalladium chloride (0.196 g).

Example 3

In a 50 ml volume flask, palladium black (0.075 g), pyridine hydrochloride (0.16 g), 30% aqueous hydrogen peroxide solution (0.3 ml) and water (10 ml) were charged, and the resultant mixture was refluxed for 25 hours. The reaction mixture was cooled and shaken with chloroform. The chloroform layer was poured into a small amount of petroleum ether. The precipitate was collected by filtration, washed and dried to give bispyridinepalladium chloride (0.168 g).

Example 4

In a 50 ml volume flask, palladium black (0.075 g), pyridine hydrochloride (0.16 g), conc. nitric acid (0.5 ml) and o-dichlorobenzene (10 ml) were charged, and the resultant mixture was refluxed for 20 minutes. The reaction mixture was cooled and treated as in Example 1 to give bispyridinepalladium chloride (0.232 g).

Example 5

In a 50 ml volume flask, palladium black (0.075 g), pyridine hydrochloride (0.16 g), 2,4-dinitrotoluene (2.5 g) and o-dichlorobenzene (10 ml) were charged, and the resultant mixture was refluxed for 1 hour. The reaction mixture was cooled and treated as in Example 1 to give bispyridinepalladium chloride (0.150 g).

Example 6

As in Example 5 but using monochlorobenzene in place of o-dichlorobenzene and refluxing for 5 hours, the reaction and the treatment of the reaction mixture were carried out to give bispyridinepalladium chloride (0.144 g).

Example 7

As in Example 5 but using benzene in place of o-dichlorobenzene and refluxing for 5 hours, the reaction and the treatment of the reaction mixture were carried out to give bispyridinepalladium chloride (0.100 g).

Example 8

In a 50 ml volume flask, palladium black (0.075 g), isoquinoline hydrochloride (0.28 g) and o-dichlorobenzene (10 ml) were charged, and the resultant mixture was refluxed for 1 hour while introducing air therein. The reaction mixture was cooled and treated as in Example 1 to give a pale yellow powder (0.043 g). By the elementary analysis and the infrared absorption spectrum, the product was confirmed to be bisisoquinolinepalladium chloride.

Example 9

In a 100 ml volume flask, palladium black (1.06 g), 2,4-dinitrotoluene (7.28 g), pyridine (1.58 g), 35 % hydrochloric acid (2.08 g) and o-dichlorobenzene (50 ml) were charged, and the resultant mixture was heated while stirring so as to eliminate water as its azeotropic mixture with o-dichlorobenzene, followed by stirring at 180°C for 1 hour. The reaction mixture was treated as in Example 1 to give bispyridinepalladium chloride (1.49 g).

Example 10

In a 100 ml volume flask, palladium black (0.371 g), pyridine (0.56 g), 35 % hydrochloric acid (0.72 g), 60 % nitric acid (0.74 g) and o-dichlorobenzene (50 ml) were charged, and the resultant mixture was refluxed for 1 hour while stirring. The reaction mixture was cooled and poured into cyclohexane (200 ml). The precipitate was collected by filtration and dried to give bispyridinepalladium chloride (1.113 g).

Example 11

In a 50 ml volume autoclave, palladium black (0.075 g), pyridine hydrochloride (0.324 g) and o-dichlorobenzene (10 ml) were charged, and oxygen gas was introduced therein up to a gauge pressure of 10 kg/cm$^2$. The resultant mixture was heated at 150°C for 30 minutes while stirring. The reaction mixture was cooled and treated as in Example 1 to give bispyridinepalladium chloride (0.233 g). Further, the similar procedure was carried out with air as the oxidizing agent in place of oxygen to give the same result.

Example 12

As in Example 11 but using pyridine (0.22 g) and phenylcarbamoyl chloride (0.44 g) in place of pyridine hydrochloride, the reaction and the treatment of the reaction mixture were carried out to give bispyridinepalladium chloride (0.228 g).

Example 13

In a 50 ml volume autoclave, palladium black (0.106 g), pyridine (0.31 g), carbon tetrachloride (0.61 g) and o-dichlorobenzene (10 ml) were charged, and oxygen gas was introduced therein up to a gauge pressure of 10 kg/cm$^2$. The resultant mixture was heated at 150°C for 4 hours. After cooling, the reaction mixture was filtered. The collected material was washed with chloroform, and the washing was combined with the filtrate and the combined mixture was poured into a large amount of petroleum ether. The precipitate was collected by filtration, washed with petroleum ether and dried under reduced pressure to give a pale yellow powder (1.67 g). Yield, 50 %. By the elementary analysis and the infrared absorption spectrum, the product was confirmed to be bispyridinepalladium chloride.

Example 14

In a 50 ml volume autoclave, palladium black (0.106 g), pyridine (0.31 g), thionyl chloride (0.24 g) and o-dichlorobenzene (10 ml) were charged, and oxygen gas was introduced therein up to a gauge pressure of 10 kg/cm$^2$. The resultant mixture was heated at 150°C for 4 hours. After cooling, the reaction mixture was treated as in Example 13 to give bispyridinepalladium chloride (0.335 g). Yield, quantitative.

Example 15

In a 50 ml volume autoclave, palladium black (0.106 g), pyridine (0.31 g), titanium tetrachloride (0.37 g) and o-dichlorobenzene (10 ml) were charged, and oxygen gas was introduced therein up to a gauge pressure of 10 kg/cm$^2$. The resultant mixture was heated at 150°C for 4 hours. After cooling, the reaction mixture was filtered. The collected material was washed with chloroform and dimethylacetamide in order. By the quantitative determination of the remaining palladium black, the conversion of the palladium black was confirmed to be 90 %.

Example 16

In a 50 ml volume autoclave, palladium black (0.106 g), pyridine (0.31 g), phosphorus trichloride (0.183 g) and o-dichlorobenzene (10 ml) were charged, and oxygen gas was introduced therein up to a gauge pressure of 10 kg/cm$^2$. The resultant mixture was heated at 150°C for 4 hours. After cooling, the reaction mixture was treated as in Example 13 to give bispyridinepalladium chloride (0.335 g). Yield, quantitative.

Example 17

In a 50 ml volume autoclave, palladium black (0.106 g), pyridine (0.31 g), thionyl chloride (0.24 g), t-butylhydroperoxide (0.20 g) and o-dichlorobenzene (10 ml) were charged. After replacement of the atmosphere by nitrogen gas, the resultant mixture was heated at 130°C for 2 hours while stirring. The reaction mixture was cooled and treated as in Example 13 to give bispyridinepalladium chloride (0.329 g). The absence of any remaining palladium black was confirmed.

Example A

In a 100 ml volume stainless steel made autoclave equipped with a magnetic stirrer, 2,4-dinitrotoluene (5.00 g), bispyridinepalladium chloride (0.235 g), water (12.6 mg) and o-dichlorobenzene (20 ml) were charged, and carbon monoxide was introduced therein up to a gauge pressure of 170 kg/cm$^2$. The resultant mixture was heated at 190°C for 4 hours while stirring. After cooling, the gas was released, and the contents were filtered. The collected material was washed with o-dichlorobenzene. By the gas chromatographic analysis of the combined mixture of the washing and the filtrate, it was confirmed that 88 % of the starting 2,4-dinitrotoluene was reacted and 21 % of toluene-2,4-diisocyanate was produced.

The above collected material after washing with o-dichlorobenzene was further washed with N,N-dimethylacetamide and acetone and dried to give a black solid. The solid was dissolved in aqua regia (20 ml). The quantitative determination of the amount of palladium in the resultant solution revealed an amount of 41.4 mg. Namely, 55.6 % of the bispyridinepalladium chloride as used was decomposed to give metallic palladium.

Example B

As in Example A, 2,4-dinitrotoluene and carbon monoxide were reacted. After cooling, the gas was released. Pyridine hydrochloride (0.14 g) was added thereto. Oxygen gas was introduced therein up to a gauge pressure of 10 kg/cm$^2$. The resultant mixture was heated at 130°C for 3 hours while stirring. After cooling, the contents were filtered. Treatment of the collected material and the filtrate as in Example A revealed that the conversion of 2,4-dinitrotoluene is 92 %, the yield of toluene-2,4-diisocyanate is 23 % and the amount of metallic palladium is less than 1 % of that of the palladium complex compound as used.

What is claimed is:

1. A process for preparation of a palladium complex compound represented by the formula $PdL_2X_2$, wherein L is a nitrogen-containing heteroaromatic compound and X is a halogen atom, which comprises reacting (A) metallic palladium, (B) a nitrogen-containing heteroaromatic compound selected from the group consisting of pyridine, 2-chloropyridine, 2-bromopyridine, 2-fluoropyridine, 4-phenylpyridine, α-picoline, 5-ethyl-α-picoline, lutidine, 2-vinylpyridine, 2-styrylpyridine, 3-chloropyridine, 2,6-dichloropyridine, 2-chloro-4-methylpyridine, 4-phenylthiopyridine, 2-methoxypyridine, phenyl α-picolinate, methyl α-picolinate, 2,6-dicyanopyridine, α-picolylaldehyde, α-picolinamide, 5,6,7,8-tetrahydroquinoline, 2,2'-dipyridine, quinoline, isoquinoline, 2-chloroquinoline, acridine, phenanthridine, 1,5-naphthyridine, 1,6-naphthyridine, 1,7-naphthyridine, 1,8-naphthyridine, 2,6-naphthyridine, 2,7-naphthyridine, benzo[h]quinoline, benzo[f]quinoline, benzo[g]quinoline, benzo[h]isoquinoline, benzo[f]isoquinoline, benzo[g]isoquinoline, pyrazine, pyrimidine, pyridazine, quinazoline, phthalazine, quinoxaline, cinnoline, phenazine, polyvinylpyridine and styrene-vinylpyridine copolymer, (C) a halogen compound selected from the group consisting of hydrogen fluoride, hydrogen chloride, hydrogen bromide, hydrogen iodide, aluminum chloride, aluminum bromide, boron chloride, carbon tetrachloride, chloroform, bromoform, phosgene, carbonyl bromide, benzyl chloride, benzyl bromide, benzotrichloride, acetyl chloride, benzoyl chloride, phthaloyl dichloride, silicon tetrachloride, trimethylsilyl chloride, dimethyldichlorosilane, tin tetrachloride, titanium tetrachloride, phosphorus trichloride, phosphorus pentachloride, phosphorus tribromide, phosphorus pentabromide, phosphorus oxychloride, thionyl chloride, thionyl bromide, sulfuryl chloride, tetramethylammonium chloride and tetramethylammonium bromide and (D) an oxygen-containing oxidizing agent, the nitrogen-containing heteroaromatic compound being used in an amount of about 2 to 200 moles per one mole of the metallic palladium, the halogen compound being used in a stoichiometric amount or in excess with respect to the metallic palladium and the oxygen-containing oxidizing agent being used in an equimolar amount or more, in terms of the effective oxygen atom therein, with respect to the metallic palladium.

2. The process according to claim 1, wherein the oxygen-containing oxidizing agent is a member selected from the group consisting of air, oxygen, ozone, hydrogen peroxide, hydroxylamine, alkyl hydroperoxides, dialkyl peroxides, organic peracids, organic peracid anhydrides, organic peracid esters, nitric acid, nitrates, nitric acid esters, tertiary amine oxides, nitrile oxides, organic nitro compounds, permanganates, bichromates, hypochlorites and persulfates.

3. The process according to claim 1, wherein the reaction is carried out in an appropriate solvent.

4. The process according to claim 3, wherein the solvent is a member selected from the group consisting of aromatic hydrocarbons, halogenated hydrocarbons, alcohols, ethers, carboxylic acids, esters, nitriles, amides, sulfoxides and water.

5. The process according to claim 1, wherein the reaction is carried out at a temperature of from about 0° to 250°C.

6. The process according to claim 5, wherein the reaction is carried out at a temperature of from about 50° to 200°C.

* * * * *